United States Patent Office 3,639,480
Patented Feb. 1, 1972

3,639,480
NOVEL ALKOXY-SUBSTITUTED SCHIFF BASES
Anne-Marie W. Kubanek, Basking Ridge, N.J., assignor to Allied Chemical Corporation, New York, N.Y.
No Drawing. Filed Apr. 4, 1969, Ser. No. 813,703
Int. Cl. C07c 119/00
U.S. Cl. 260—566 F          5 Claims

ABSTRACT OF THE DISCLOSURE

Novel compounds of the structure:

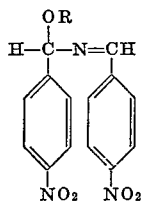

wherein R is a $C_1$ to $C_5$ alkyl radical, are obtained by reacting para-nitrobenzaldehyde with alcohol and ammonium acetate. These compounds have insecticidal and nematocidal properties.

BACKGROUND OF THE INVENTION

New insecticides and nematocides having reduced toxicity to plants or higher-life forms are always useful. Unfortunately, such insecticides are frequently difficult to make or they can only be prepared from expensive or unusual starting materials. To be commercially useful, an insecticide should be readily preparable from inexpensive starting materials.

SUMMARY OF THE INVENTION

It has now been found in accordance with the instant invention that para-nitrobenzaldehyde can be reacted with an alcohol (ROH) and ammonium acetate to form a compound of the structure:

(I)  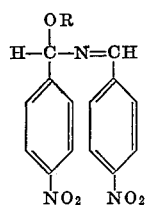

wherein R is a $C_1$–$C_5$ alkyl radical corresponding to the R group of the alcohol, ROH. If benzaldehyde is used, the reaction does not take place. As heretofore indicated, I have found compounds of the structure (I) to possess insecticidal and nematocidal properties. Compound (I) is particularly suitable for insecticidal use in compositions prepared in accordance with the process of U.S. Pat. 3,168,437. Additionally, compound (I) can be catalytically hydrogenated to form the compound (II):

(II)  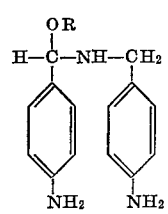

Compound (II) is useful as a curing agent for epoxide resins and as an antioxidant for lubricants.

The reaction between benzaldehyde, alcohol and ammonium acetate is preferably carried out at room temperature because of the added convenience. The maximum temperature is limited only by the boiling point of the benzaldehyde-ammonium acetate-alcohol mixture. As a practical matter, the minimum reaction temperature is ordinarily that temperature at which the ammonium acetate starts to precipitate from the mixture. With very dilute solutions, i.e., when a large excess of alcohol is used, precipitation will not occur, and the minimum temperature is the freezing point of the mixture. Since no advantage accrues from the use of higher or lower temperatures, the reaction is preferably carried out at room temperature. The reaction is not influenced by pressure and so, for the sake of convenience, is preferably carried out at atmospheric pressure.

The preparation of compound (I) utilizes two mols of para-nitrobenzaldehyde and one mol each of alcohol and ammonium acetate.

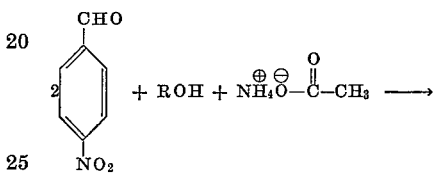

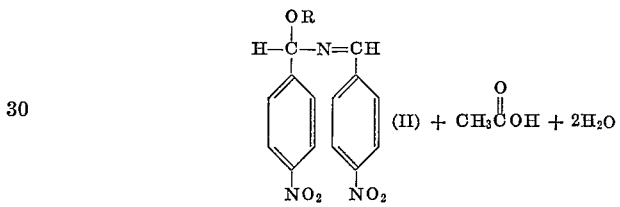

The reaction may be carried out by simply mixing together the above-stated quantities of para-nitrobenzaldehyde, alcohol (ROH), and ammonium acetate. Preferably an excess of alcohol and of ammonium acetate is reacted with the para-nitrobenzaldehyde. Most preferably, an alcohol solution of para-nitrobenzaldehyde is mixed with an alcohol solution of ammonium acetate. Under such circumstances, compound (I), which is a solid and generally forms essentially quantitatively, will almost instantaneously start to precipitate from the reaction solution. It can be separated from the reaction mixture by filtration, decantation, or similar known methods. If further purification is desired, compound (I) can be recrystallized from a solvent such as methanol. Except in extremely dilute solutions, i.e., where a large excess of alcohol is used, essentially all of compound (I) will precipitate. In very dilute solutions, some chilling of the reaction mixture may be necessary to achieve complete precipitation of compound (I).

As heretofore indicated, the R moiety of the alcohol, ROH, can be an alkyl group of 1 to 5 carbon atoms; said alkyl group can be straight or branched chain, so that the alcohol can be primary, secondary or tertiary. With tertiary alcohols, due to steric hindrance, the reaction rate and the yields of compound (I) tend to be somewhat lower than with primary or secondary alcohols. Preferably, R is methyl or ethyl.

The invention can be more fully understood by reference to the following examples. All parts are parts by weight unless otherwise expressly noted.

EXAMPLE 1

Six parts of para-nitrobenzaldehyde is dissolved with heating in 75 parts of absolute methanol. The solution is cooled and mixed at room temperature under a stream of nitrogen with a solution of ammonium acetate (3.08 parts) in 25 parts of absolute methanol. After a few minutes, the product in the form of white needles starts to precipitate out. The solution is cooled resulting in further precipitation, and the precipitate collected, yielding 6.7 parts of crude material, melting point 121.5°–124.5° C. recrystallization from methanol gives:

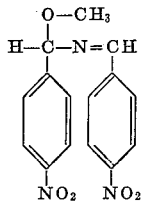

(5.0 parts, 90%), melting point 127°–127.5° C.

Infrared spectrum (KBr pellet) shows strong adsorption bands at 1650 cm.$^{-1}$, 1515 cm.$^{-1}$, 1345 cm.$^{-1}$ and 1065 cm.$^{-1}$; ultraviolet λ maximum in $CH_3OH$=278 m$\mu$ (log extinction coefficient 4.20).

Elemental analysis.—Calculated for $C_{15}H_{13}N_3O_5$: Theory (percent): C, 57.16; H, 4.16; N, 13.32. Found (percent): C, 67.16; H, 4.28; H, 12.90.

EXAMPLE 2

Preparation of

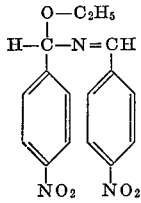

The same procedure is used as described for the methoxy compound of Example 1 with the exception of the use of absolute ethanol in place of methanol. 5.7 parts of cured material is isolated and from this product 1.35 parts (21%) of a colorless product is recovered after recrystallization from ethanol-benzene 1:1 mixture, melting point 87.55°–88.5° C.

Infrared spectrum (KBr pellet) shows strong adsorption bands at 1650 cm.$^{-1}$, 1515 cm.$^{-1}$, 1345 cm.$^{-1}$ and 1065 cm.$^{-1}$.

Elemental analysis.—Calculated for $C_{16}H_{15}N_3O_5$: Theory (percent): C, 58.36; H, 4.49; N, 12.76. Found (percent); C, 58.38; H, 4.40; N, 13.12.

Nuclear magnetic resonance analysis confirms the structure.

I claim:
1. A compound of the structure:

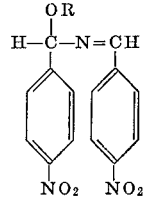

wherein R is a $C_1$ to $C_5$ alkyl radical.

2. A compound in accordance with claim 1 wherein R is methyl or ethyl.

3. A process for prepariting the compound of claim 1 comprising admixing para-nitrobenzaldehyde with at least one-half mol equivalent each of ammonium acetate and an alcohol, ROH, wherein R is as defined in claim 1.

4. A process in accordance with claim 3 wherein said alcohol is methanol or ethanol.

5. A process in accordance with claim 3 wherein said benzaldehyde is reacted with a solution of ammonium acetate in alcohol.

References Cited

UNITED STATES PATENTS 3,483,131    12/1969    Kovacic _____ 252—301.2
3,261,869    7/1966     Johnson _____ 260—570.9
2,155,356    4/1939     Britton et al. _____ 260—566

LEON ZITVER, Primary Examiner

G. A. SCHWARTZ, Assistant Examiner

U.S. Cl. X.R.

260—570.6, 999